(12) United States Patent
Lee et al.

(10) Patent No.: US 6,804,440 B2
(45) Date of Patent: Oct. 12, 2004

(54) INTEGRATED MODE CONVERTER, WAVEGUIDE, AND ON-CHIP FUNCTION

(75) Inventors: Kevin K. Lee, Malden, MA (US); Desmond R. Lim, Singapore (SG); Tae H. Park, Cambridge, MA (US)

(73) Assignee: LNL Technologies, Inc., Cambridge, MA (US)

( * ) Notice: Subject to any disclaimer, the term of this patent is extended or adjusted under 35 U.S.C. 154(b) by 12 days.

(21) Appl. No.: 10/314,431

(22) Filed: Dec. 7, 2002

(65) Prior Publication Data

US 2004/0017962 A1 Jan. 29, 2004

Related U.S. Application Data

(60) Provisional application No. 60/398,950, filed on Jul. 26, 2002.

(51) Int. Cl.[7] .............................. G02B 6/12; G02B 6/26
(52) U.S. Cl. ............................ 385/114; 385/28; 385/50
(58) Field of Search ......................... 385/14, 129, 130, 385/131, 132, 39, 43, 24, 28, 50, 49, 48

(56) References Cited

U.S. PATENT DOCUMENTS

| | | | | |
|---|---|---|---|---|
| 3,864,019 A | * | 2/1975 | Smolinksky et al. | 385/49 |
| 3,994,559 A | * | 11/1976 | Crow et al. | 385/49 |
| 5,199,092 A | | 3/1993 | Stegmueller | |
| 5,410,623 A | * | 4/1995 | Minami et al. | 385/15 |
| 5,465,312 A | * | 11/1995 | Maxwell et al. | 385/49 |
| 5,703,977 A | * | 12/1997 | Pedersen | 385/28 |
| 6,631,225 B2 | * | 10/2003 | Lee et al. | 385/28 |
| 6,672,773 B1 | * | 1/2004 | Glenn et al. | 385/70 |
| 6,697,551 B2 | * | 2/2004 | Lee et al. | 385/28 |
| 2002/0031296 A1 | | 3/2002 | Lee et al. | |
| 2002/0110328 A1 | * | 8/2002 | Bischel et al. | 385/49 |
| 2004/0037497 A1 | * | 2/2004 | Lee | 385/28 |

FOREIGN PATENT DOCUMENTS

WO WO 01/01465 A1 1/2001

OTHER PUBLICATIONS

T. Brenner and H. Melchior, Integrated Optical Modeshape Adapters in GaAsP/InP for Efficient Fibert–to–Waveguide Coupling, IEEE Photonics Technology Letters. vol. 5 No. 9, Sep. 1993 (pp. 1053–1056).

R. Zengerle, O. Leminger, W. Weiershausen, K. Faltin, and B. Hubner, Laterally Tapered InP–InGaAsP Waveguides for Low–Loss Chip–to–Fiber Butt Coupling: A Comparison of Different Configurations, IEEE Photonics Technology Letters, vol. 7, No. 5, May 1995 (pp. 532–534).

TH. Schwander, S. Fischer, A. Kramer, M. Laich, K. Luksic, G. Spatchek and M. Warth, Simple and Low–Loss Fibre–to–Chip Coupling by Integrated Field–Matching Waveguide in InP, Electronics Letters, Feb. 18, 1993, vol. 29, No. 4 (pp. 326–328).

Ingrid Moerman, Peter P. Van Daele, and Piet M. Demeester, A Review on Fabrication Technologies for the Monolithic Integration of Tapers with III–V Semiconductor Devices, IEEE Journal of Selected Topics in Quantum Electronics, vol. 3, No. 6, Dec. 1997, (pp. 1308–1320).

Achyut K. Dutta and Masahiro Kobayashi, Optical Components and Their Packaging/Module Trends for WDM Communication, Invited Paper, Fujitsu Compound Semiconductors, Inc. Proceedings of SPIE, vol. 4870 (2002) (pp. 444–455).

* cited by examiner

*Primary Examiner*—John R. Lee
*Assistant Examiner*—James P. Hughes
(74) *Attorney, Agent, or Firm*—Edwards & Angell, LLC; Howard M. Gitten

(57) ABSTRACT

An integrated device includes a waveguide, which may be connected to a photonic circuit and an external fiber, and an on-chip device formed on an optical chip by forming a region in which the waveguide terminates. The region is bounded by reflective surfaces. Light coming from the waveguide is essentially trapped inside the region and directed to an on-chip device disposed in the region.

An integrated device consists of a low index difference waveguide, an on-chip mode converter, a high index difference waveguide, and an on-chip function formed on a single optical chip so that the high index difference waveguide is close to the substrate surface upon which the mode converter is formed. Substrate surface height differences are provided to define different substrate surface mounting heights for a low index difference waveguide, high index difference waveguide, a mode converter, and an on-chip device. The height differentials provide close proximity of components allowing on-chip devices, such as a Ge detector or electronics, to be integrated on a chip with the high index difference waveguide that is connected to a mode converter.

36 Claims, 11 Drawing Sheets

INTEGRATED MODE CONVERTER, WAVEGUIDE, AND ON-CHIP FUNCTION

PRIORITY INFORMATION

This application claims priority from U.S. provisional application Ser. No. 60/398,950 filed on Jul. 26, 2002, entitled INTEGRATED MODE CONVERTER, WAVEGUIDE, AND ON-CHIP FUNCTION.

BACKGROUND OF THE INVENTION

Field of Invention

The present invention relates generally to methods and systems for integrating a mode converter, waveguides, and an on-chip device such as a detector on a single substrate.

Background

Optical waveguides and waveguide devices have enabled optical telecommunications, by providing ways of guiding light through a medium and by performing useful operations such as distinguishing different wavelengths from a single optical signal. These traditional waveguide structures, having a low index difference between core and cladding layer, are typically large in its mode field, and they impose a fabrication constraint for integrating with current state-of-the-art semiconductor circuits due to relative size differences. Recent advances in the fabrication process and design of waveguides with high index difference between core and cladding layer have enabled waveguides and waveguide devices to be miniaturized in planar lightwave circuits ("PLC").

The on-chip waveguides used to miniaturize PLCs can be high index difference waveguides. These high index difference waveguides have smaller bending radii than large mode field size waveguides and low index difference waveguides, and therefore bending and splitting of propagating light can be implemented in smaller areas using such high index difference waveguides.

The miniaturization of PLCs on a similar scale as semiconductor integrated circuits enables integration of optical waveguides, optoelectronics, and electronic integrated circuits in one chip. However, as the size of on-chip waveguides and waveguide devices is miniaturized, the optical mode in the on-chip waveguides is mismatched with the optical mode in external fibers. Typically, external fibers, having a waveguide core of approximately 10 micron in diameter, have large mode field sizes, therefore low index difference waveguides, whereas a high index difference waveguide has substantially smaller mode field. This mismatch in mode size between an external fiber and an on-chip waveguide creates a connection loss between the PLC chip and the external fiber when the two are directly connected. An abrupt change in the refractive index at the interface between an external fiber, a low index waveguide, and an on-chip high index waveguide, also causes transmitted power loss due to the reflection of the light wave signal.

To resolve the connection loss between a miniaturized waveguide and an external fiber, an on-chip mode converter can be used to reduce this connection loss, as shown in U.S. patent application Publication No. 20020031296 A1. Such an on-chip mode converter has a thick lower cladding (cladding between a substrate and the waveguide core) and a thick upper cladding (cladding above the core). The thick cladding layers are needed for the low index difference part of the waveguide. Because of the thick lower cladding, the waveguide core is many microns away from the substrate.

Such a light wave mode conversion concept is also shown in publications such as in IEEE Photonics Technology Letters, Vol. 5, No. 9, September 1993 by Brenner et al., in IEEE Photonics Technology Letters, Vol. 7, No. 5, May 1995 by Zengerle et al., in Electronics Letters, Vol. 29, No. 4, February 1993, by Schwander et al., in IEEE Journal of Selected Topics in Quantum Electronics, Vol. 3, No. 6, December 1997 by Moerman et al., in Proceedings of SPIE, Vol. 4870, 2002 by Dutta et al., and in U.S. Pat. No. 5,199,092 issued to Stegmueller et al. Many of these optical mode converting structures require thick lower cladding and upper cladding layers as the one described earlier, causing the waveguide core to be many microns away from the substrate. Due to such a geometric constraint, there is a difficulty in integrating the waveguide with an on-chip device. On-chip devices are typically built relatively close to a substrate, and since the waveguide core is many microns away from the substrate, there exists a rather large distance between the waveguide core and an on-chip device. Coupling light from the waveguide core through the large distance to an on-chip device is difficult. Even for PLCs with just low index contrast waveguides, the distance between the waveguide core and the on-chip device is large. Therefore similar types of geometric constraints exist for integrating low index contrast waveguides with on-chip devices.

SUMMARY OF THE INVENTION

The present invention is directed to an integrated device that includes a waveguide and an on-chip device formed on an optical chip so that an efficient coupling is made between the waveguide and an on-chip device by forming a region surrounded by metal, where the waveguide terminates in. In one embodiment, the region is formed at the end of a waveguide that encloses the end of the waveguide and an on-chip detector. A light coming from the core of a waveguide is essentially trapped inside a region surrounded by metal and directed to the on-chip detector for coupling of light.

The present invention is also directed to an integrated device that includes a low index difference waveguide, an on-chip mode converter, a high index difference waveguide, and an on-chip function formed on an optical chip, so that these are built on a single substrate at different surface heights, making the high index difference waveguide close to the substrate surface. In one embodiment, a trench is formed on one end of the substrate, and the mode converter and low index difference waveguide can be formed on the surface of this trench. The high index difference waveguide can be formed either on the unprocessed surface of the substrate or on the surface of a trench that is relatively shallower than the one used for the mode converter and low index difference waveguide. The on-chip function can be formed on the unprocessed surface of the substrate. This allows the core of the high index difference waveguide to be close to the surface of the substrate. By having the high index difference waveguide in close proximity to the surface of the substrate, devices such as on chip Ge detectors and electronics can be integrated on a chip with the waveguide that is connected to the mode converter.

Different on-chip functions can be integrated using the aspects of the invention described above and in more detail below. An example would be an on-chip Ge detector, and using the aspects of the invention described, the integration of a mode converter, high index difference waveguide and a Ge detector on a silicon substrate is possible.

This invention accordingly comprises the features of construction, combination of elements, arrangement of parts, which will be exemplified in the disclosure.

BRIEF DESCRIPTION OF THE DRAWINGS

In the drawings, figures are not in scale and provided as an illustrative, non-limiting examples of embodiments of the present invention.

DETAILED DESCRIPTION OF THE INVENTION

Figure 1:
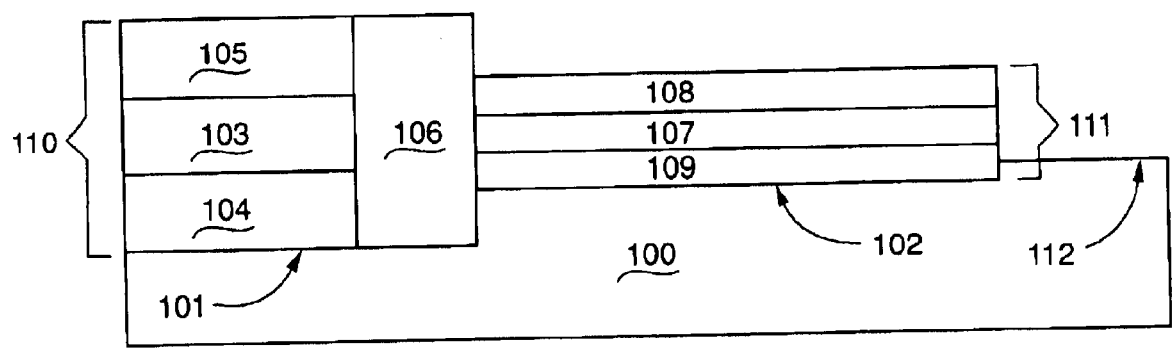
FIG. 1 is a side elevational view of an integrated low and high index difference waveguides with a mode converter and an on-chip device on the same substrate.

One coupling method is to reduce the distance between the waveguide core and an on-chip device. The reduced distance between the waveguide core and an on-chip device is desirable since a closer proximity between the two can also better transmit light to the on-chip device and vice versa. For instance, on-chip detectors made using germanium (Ge) directly grown on silicon by epitaxial growth have been demonstrated in the prior art, such as in International Publication No. WO 01/01465 A1. In order to deliver the guided light to the on-chip Ge detector, the waveguide which carries the light has to be in close proximity to the Ge detector, and the waveguide should therefore be close to the silicon surface on which Ge is epitaxially grown. Therefore, there is a need for a waveguide to be close to the silicon surface for light detection. In other words, a thin lower cladding is necessary for on-chip detection of guided light. Similar method can be used for other on-chip functions.

One aspect of the present invention is directed to an integrated device that includes an on-chip mode converter that consists of both low and high index difference waveguides so that the high index difference waveguide is close to the substrate on which the mode converter is built. One end of the mode converter is a low index difference waveguide whose mode size is typically matched to that of external optical devices such as an optical fiber. The other end of the mode converter is typically a high index difference waveguide. By having the high index difference waveguide in close proximity to the substrate, devices such as on-chip Ge detectors and electronic circuits can be integrated on a chip with the waveguide that is connected to the mode converter. Such detectors or other on-chip functions can be connected, either optically or electronically, to inputs/outputs of other devices or other areas of the chip.

According to one embodiment of the invention, the low index difference side of the mode converter is built on a trench that is formed in the substrate. Therefore, the surface height of trench is below the height of the rest of the substrate, and in particular, the part of the substrate having the high index difference portion of the waveguide of the converter. The claddings and the core of the low index difference waveguide in the converter are all built over the trench. The high index difference waveguide, on the other hand, is built either on the normal substrate surface or on a surface of a trench that is formed in the substrate. The trench height, in this case for the high index difference waveguide, is between the height of the trench used for the low index difference side of the mode converter and the height of the substrate. The high index difference waveguide does not require a thick lower cladding, and therefore, the high index difference waveguide core can be close to the substrate. By forming another trench on which the high index difference waveguide is built, the proximity between the waveguide and an on-chip detector can be manipulated. This allows for a detector, such as a Ge detector that is epitaxially grown on the surface of the substrate, to be formed close enough to the core of the high index difference waveguide so that it can be effectively used.

As used throughout this specification, a low index difference waveguide, in a channel waveguide embodiment, is a waveguide where delta ($\Delta$) for the index of refraction $n_1$ of the core material and the index of refraction $n_3$ of the cladding material is generally very small, such as less than 0.1 (10 percent). In other words:

$$\Delta = \frac{n_1 - n_3}{n_3} < 0.1.$$

In some embodiments, this index difference $\Delta n$ is such that $\Delta$ is less than 0.01 (1 percent) or less than 0.04 (4 percent).

A high index difference waveguide in a channel waveguide embodiment, on the other hand, is a waveguide where delta (Δ) for the index of refraction $n_2$ of the core material and the index of refraction $n_3$ of the cladding material is at least 0.1. In other words:

$$\Delta = \frac{n_2 - n_3}{n_3} \geq 0.1.$$

In other embodiments, the index difference Δn is such that Δ for a high index difference waveguide is at least 0.2, and for still other embodiments, Δ is at least 0.3.

As used throughout this specification, a "low index difference waveguide" is a waveguide that has a mode field size similar to that of an external fiber. For a channel waveguide embodiment, for example, such a low index difference waveguide is a waveguide, as described above, where Δ is less than 0.1. Other types of waveguides aside from channel waveguides, however, can be used as low index difference waveguides if the mode field size is similar.

As used throughout this specification, a "high index difference waveguide" is a waveguide that is a low minimum bending radius waveguide as described in the following paragraph. In a channel waveguide embodiment, for instance, such a high index difference waveguide is a waveguide, as described above, where Δ is at least 0.1 (or at least 0.2 or 0.3 in other embodiments). Other types of waveguides, such as rib waveguides, can also be used for high index difference waveguides.

Low minimum bending radius waveguides are waveguides that have smaller bending radii than large mode size waveguides and low index difference waveguides. This allows optical functions and bending and splitting of propagating light to be implemented in smaller areas using such low minimum bending radius waveguides. A "minimum bending radius" can be defined as the radius for a 90 degree bend in which the loss during the bend is less than or equal to a certain amount, such as 0.5 dB in one embodiment. In other embodiments, a minimum bending radius can be for a loss of less than or equal to 0.1 dB in a 90 degree turn or, in still other embodiments, a loss of less than or equal to 0.01 dB in a 90 degree turn. Throughout this specification, the term "low minimum bending radius" will be used to refer to a radius of less than or equal to 50 microns for a 90 degree bend in which the loss during the bend is less than or equal to 0.5 dB. As an example, the minimum bending radius for a high index difference waveguide having a delta (Δ) of 0.3, $n_{cladding}$ of 1.5, and having a 1 micron by 1 micron core dimension can be less than or equal to 50 microns and, in other embodiments, less than or equal to 20 microns, and in still other embodiments, less than or equal to 10 microns. Such a waveguide is a low minimum bending radius waveguide. As another example, the minimum bending radius for a low index difference waveguide where Δ is 0.01, $n_{cladding}$ is 1.5, and having a 5–10 micron by 5–10 micron core dimension is on the order of 1 cm. Such a waveguide is not a low minimum bending radius waveguide. In this invention, one can use low minimum bending radius waveguide in place of high index difference waveguide geometries deviating from channel waveguides.

Referring now to drawings in detail, FIG. 1 is a side elevational view of an exemplary embodiment of a mode converter and associated high index and low index difference waveguides built on two different heights of a substrate in order to have the high index difference waveguide core close to the substrate surface. The embodiment of FIG. 1 is for a channel waveguide embodiment. Other types of waveguides, however, can be used within the scope of the invention. Mode converters that convert the mode from a low index difference waveguide to the mode of a high index difference waveguide (and vice versa) can use this embodiment of FIG. 1 to achieve a high index difference waveguide core close to the substrate surface.

Referring again to FIG. 1, the mode converter 106 and the low index difference waveguide 110 are built on a substrate trench surface 101, which is lower than the unprocessed (surface prior to formation of trench) surface 112 of substrate 100. The lower substrate trench surface 101 can be formed by etching a trench into the substrate surface 112. The low index difference waveguide 110 is composed of a core 103, lower cladding 104, and upper cladding 105. Since the index difference between the core 103 and claddings 104, 105 is small, the mode size is large and the core 103, cladding 104, and cladding 105 are relatively thick. The typical thickness of either the core 103 or the claddings 104, 105 of such a low index difference waveguide having a mode similar to that of a single mode optical fiber is between 5 and 15 microns. Therefore, by building the low index difference waveguide part of the mode converter 106 on a lower substrate trench surface 101, the core 103 is closer to the height of unprocessed substrate surface 112. The mode converter 106 is also built on lower substrate trench surface 101 for the same reason—that is, so that the core remains closer to the height of unprocessed substrate surface 112 and the cores of the waveguides are substantially coplanar.

The high index difference waveguide 111 is built on a substrate trench surface 102. The high index difference waveguide can also be built on substrate surface 112, but the formation of the waveguide on a shallow trench surface such as 102, further reduces the distance of the waveguide core and the unprocessed substrate. The high index difference waveguide is composed of a core 107, upper cladding 108, and lower cladding 109. The core 107 and claddings 108, 109 are thin relative to the thicknesses of the low index difference waveguide core 103 and claddings 104, 105 because the mode of the high index difference waveguide 111 is smaller than that of the low index difference waveguide 110. The core 107 is therefore in close proximity to the unprocessed substrate surface 112. This embodiment enables integration of a high index difference waveguide, a mode converter, and other on-chip devices (such as a detector) that are close to the unprocessed substrate surface 112. Because it is necessary to have a geometric proximity of two optical devices for optimal optical coupling efficiency, providing a high index difference waveguide along with a mode converter and an on-chip device becomes easier in such an embodiment of the invention.

Figure 2:
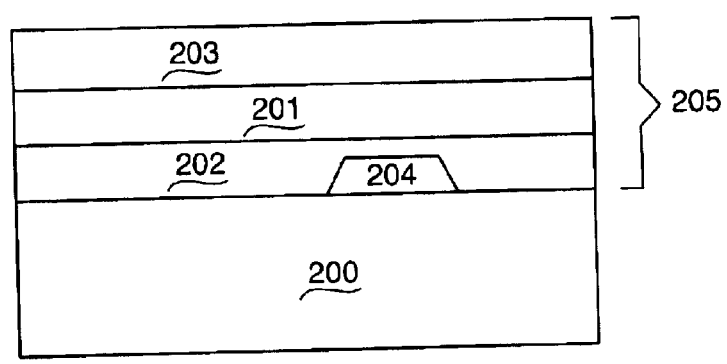
FIG. 2 is a side elevational view of high index difference waveguide in a close proximity to an on-chip device such as germanium detector grown directly on silicon.

FIG. 2 is a side elevational view of an embodiment of an on-chip device such as a detector fabricated directly on the substrate 200 that is integrated with a high index difference waveguide and that is connected to a mode converter as shown in FIG. 1. A high index difference waveguide 205 is disposed on substrate 200. Waveguide 205 includes core 201, lower cladding 202 and upper cladding 203. A device such as detector 204, by way of example, is disposed on substrate 200 between substrate 200 and core 201. The thickness of detector 204 that is directly grown on substrate 200 is rarely above 5 microns, and is typically about 1 micron or less. The high index difference waveguide 205, especially core 201, is in close proximity to on-chip detector 204 as shown in the arrangement of FIG. 2.

The light traveling in core 201 is coupled into detector 204, since detector 204 will have a higher index than the index of lower cladding 202. Waveguide core 201 is physically separated from detector 204 in the embodiment shown in FIG. 2, but waveguide core 201 can also be in contact with detector 204. The distance between core 201 and detector 204 is determined by the desired coupling efficiency between waveguide 205 and detector 204. The width (or thickness) of waveguide core 201 can be reduced right above detector 204 in order to increase the mode size in the waveguide and therefore increase the efficiency of the mode coupling into detector 204. Coupling efficiency would be increased because the evanescent field would extend further out of core 201 and into cladding 202 and into detector 204. Exemplary materials that can be used for the components in this embodiment (and similarly for other embodiments described throughout this specification) are Ge for detector 204, Si for substrate 200, and silica for claddings 203 and 202. Core 201 could be any material that forms a high index difference waveguide when clad by silica, such as silicon oxynitride, silicon nitride, silicon-rich silicon nitride, and silicon. Other materials can also be used for components within the scope of the invention.

Figure 3:
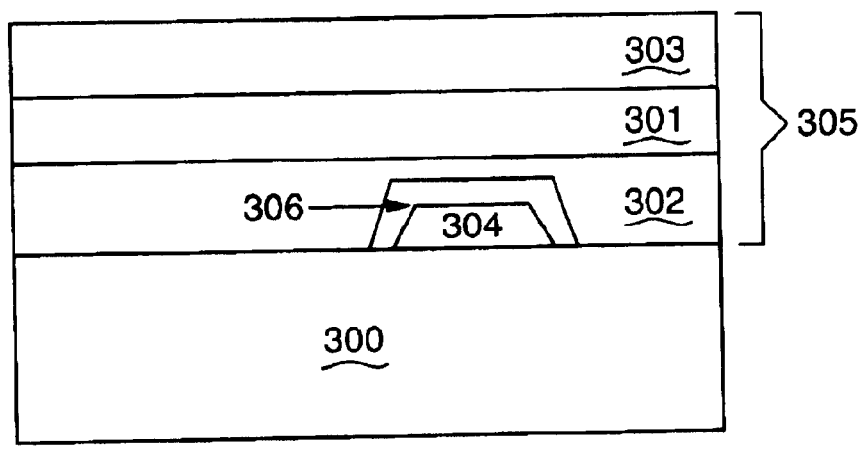
FIG. 3 is a side elevational view of an on-chip germanium detector with a passivation layer.

FIG. 3 is a side elevational view of an exemplary embodiment of an on-chip Ge detector 304 directly grown on a silicon substrate 300 constructed in accordance with the invention. Again, a high index of refraction waveguide 305 is disposed on substrate 300. Waveguide 305 includes core 301, lower cladding 302 and upper cladding 303. A detector such as detector 304 is disposed on substrate 300 between substrate 300 and core 301.

As in FIG. 2, high index difference waveguide 305, and especially core 301, is in close proximity to detector 304. This enables efficient optical coupling between core 301 and detector 304. Because Ge does not have a stable oxide compound, a layer of silicon 306 can be grown on the Ge surface of detector 304 and a silicon oxide layer can be formed on the silicon layer 306. Such an embodiment would passivate the surface of the Ge detector and remove surface states. It will protect the Ge detector from the preceding processing steps.

In the embodiment of FIG. 3, the light traveling in core 301 is coupled into detector 304 because the detector will have a higher index than the index of lower cladding 302. Waveguide core 301 is physically separated from detector 304 in this embodiment, but waveguide core 301 can also be in contact with detector 304 or its cap 306. The distance between core 301 and detector 304 is determined by the desired coupling efficiency between the waveguide and the detector. The width (thickness) of waveguide core 301 can also be reduced right above detector 304 in order to increase the mode size in the waveguide and therefore increase the mode coupling into detector 304 because the evanescent field extends further out of core 301 and into cladding 302 and detector 304.

Other geometric variations of the waveguide and detector configuration can be applied to achieve the desired coupling efficiency between waveguide 305 and detector 304. For example, the shape and the configuration of detector 304 can be tailored to minimize the reflection of the light incident on it and increase the coupling efficiency. One way to achieve it is by tapering the detector so that the width is tapered downward in the direction opposite to the light traveling in waveguide 305. Another example of enhancing the coupling efficiency between waveguide 305 and detector 304 is to create a grating on waveguide 305 such that the light traveling in core 301 is coupled into detector 304.

Figure 4:
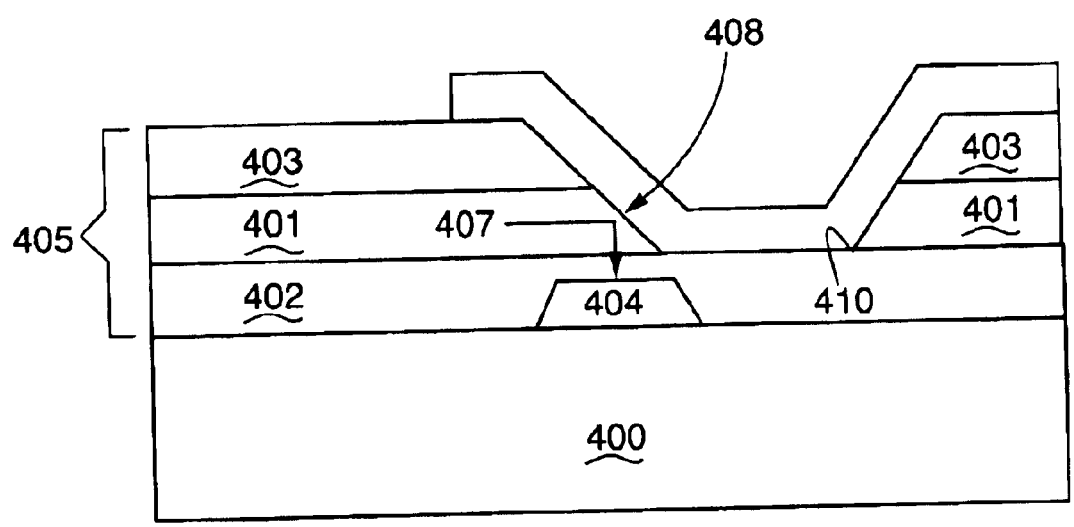
FIG. 4 is a side elevational view of high index difference waveguide and an on-chip detector with a preferential trench into the waveguide core for a light reflecting surface.

FIG. 4 is a side elevational view of another exemplary embodiment of an on-chip detector 404 that is optically connected to a high index difference waveguide 405. Again, a high index difference waveguide 405 is disposed on a substrate. Waveguide 405 includes core 401, lower cladding 402 and upper cladding 403. A device, such as an optical detector 404 by way of example, is disposed on substrate 400 within waveguide 405.

In this embodiment, a preferentially etched trench 410 is formed through the waveguide above on-chip detector 404. Trench 410 extends at least partially through core 401. A slanted surface 408 of the waveguide end facing away from detector 404 is coated with a light reflecting material such as aluminum. Surface 408 is oriented so that light traveling in core 401 is reflected off surface 408 and directed to detector 404 as indicated by arrow 407.

Figure 5:
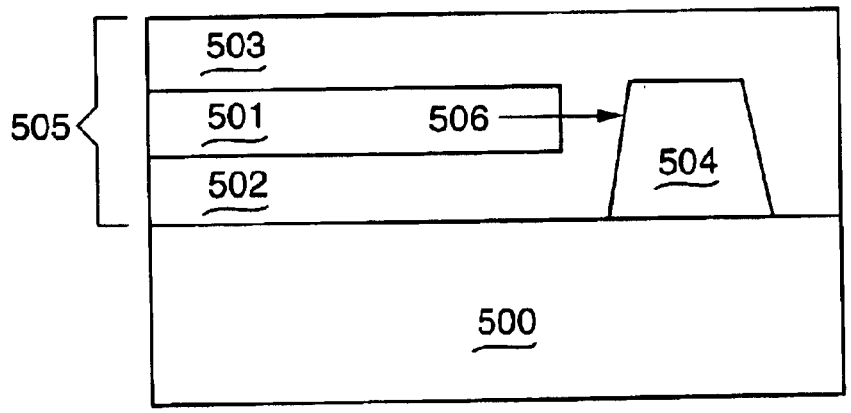
FIG. 5 is a side elevational view of butt-coupling between high index difference waveguide core and an on-chip device.

FIGS. 2 through 4 have shown coupling of light from a high index difference waveguide core to an on-chip device such as a detector where the coupling is made above the detector. Other geometric variations exist to couple light from the core to an on-chip function (device). FIG. 5 is a side elevational view of another exemplary embodiment of a high index waveguide and on-chip function constructed in accordance with the invention. A high index waveguide 505 is disposed on substrate 500. Waveguide 505 includes core 506, upper cladding 503 and lower cladding 503. A device/function, such as Ge detector 504, is disposed on substrate 500.

On-chip Ge detector 504 directly grown on a silicon substrate 500 is optically connected to a high index difference waveguide 505 which in turn is connected to a mode converted as illustrated in FIG. 1. In this embodiment, the light from core 501 comes out of the waveguide and is butt-coupled into Ge detector 504 as indicated by light path 506. Such a configuration is different from the optical coupling shown in FIGS. 2 through 4. The end of waveguide core 501 can be either in contact with or not in contact with detector 504, depending on the desired coupling efficiency.

Figure 6A:
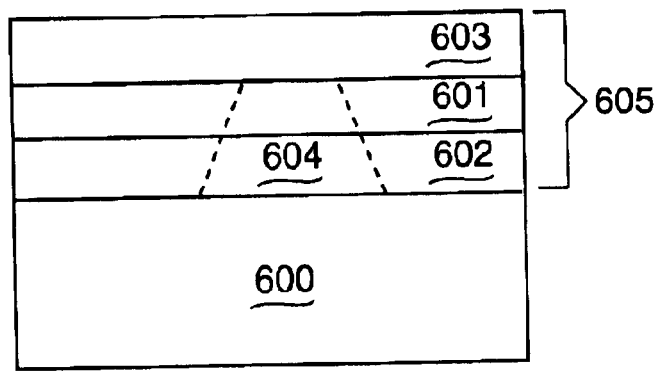
FIG. 6A is a side elevational view of high index difference waveguide core at the same height as an on-chip detector.

Reference is now made to FIG. 6A in which another exemplary embodiment of coupling light from a side of an on-chip detector is provided. FIG. 6A shows a side elevational view of high index difference waveguide 605 and on-chip detector 604. Again, a high index waveguide 605 is disposed on substrate 600. Waveguide 605 includes core 601, lower cladding 602 and upper cladding 603. The on-chip function/device, by way of example, a detector 604, is disposed on substrate 600 to optically couple with core 601.

Figure 6B:
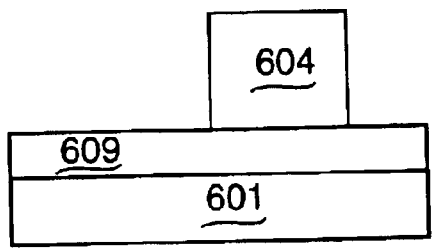
FIGS. 6B and 6C are top plan views of optical mode coupling and reflection of light between high index difference waveguide core and an on-chip device, respectively.

In this embodiment, waveguide core 601 is at the same height as detector 604. A top plan view is shown in FIG. 6B for core 601 and detector 604, and it is shown that the core is in close lateral proximity to detector 604, enhanced by the close vertical proximity achieved by the method illustrated in FIG. 1. In FIG. 6B, a top plan view of FIG. 6A, the light traveling in core 601 is coupled into detector 604, since detector 604 will have a higher index than the index of cladding layers 609. Waveguide core 601 is physically separated from detector 604 in this embodiment, but waveguide core 601 can also be in contact with detector 604. The distance between core 601 and detector 604 is determined by the desired coupling efficiency between waveguide 605 and detector 604. The width (or thickness) of waveguide core 601 can be reduced or tapered right beside detector 604 in order to increase the mode size in the waveguide and therefore increase the efficiency of the mode coupling into detector 604. In addition tapering the waveguide core, detector 604 can also be tapered for increased efficiency of mode coupling. For example, the width of the detector can be reduced in the direction opposite to the incoming light in detector 604. Coupling efficiency would be increased because the evanescent field would extend further out of core 601 and into the cladding and into detector 604.

Figure 6C:
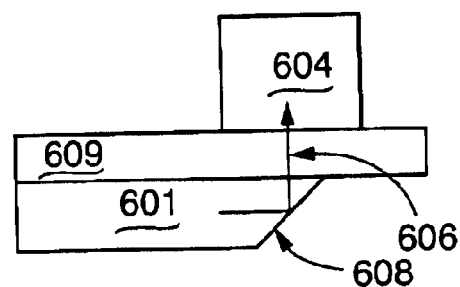

FIG. 6C shows a top plan view of another exemplary embodiment of coupling light from a side of an on-chip detector by reflecting light from the core to the on-chip detector. In this embodiment, the end of core 601 forms a slanted surface 608 facing away from detector 604. Light traveling in core 601 impinges core surface 608 with a certain incident angle determined by the degree of the slant of core surface 608 with respect to the direction of waveguide core 601. When light hits the surface, the light is reflected towards detector 604 and passes through the core/cladding interface 601/609, when the incident angle on this interface is smaller than the critical angle of the interface. A reflective material can be coated on core surface 608 to better reflect the light towards detector 604 by the light path indicated by arrow 606.

Figure 7:
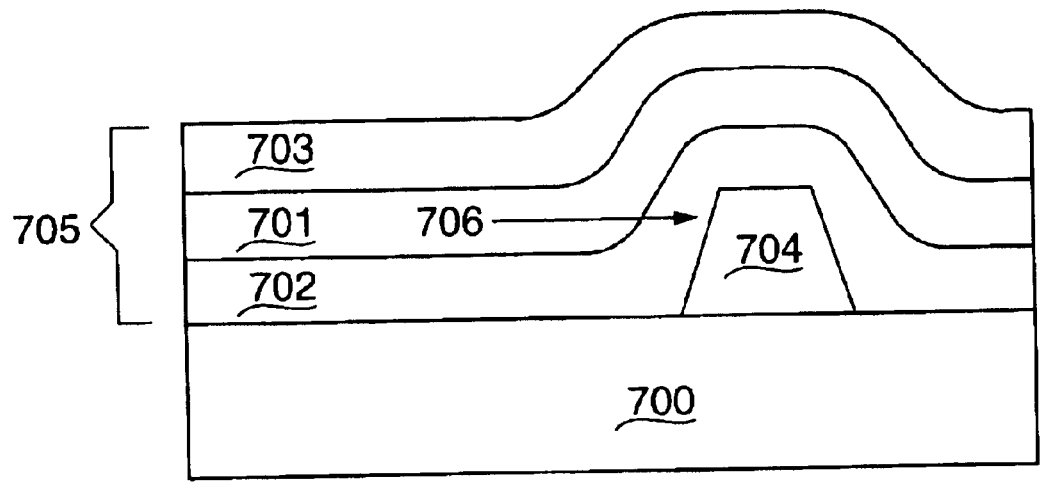
FIG. 7 is a side elevational view showing another mechanism for coupling light to a detector.

FIG. 7 is a side elevational view of an exemplary embodiment of another method of coupling light from a waveguide 705 into a detector 704. A high index waveguide 705 is disposed on substrate 700. High index waveguide 705 includes core 701, upper cladding 703 and lower cladding 702. An optic device such as detector 704 is disposed on substrate 700 and forms a discontinuity on substrate 700 such that when waveguide 705 is formed on substrate 700, waveguide 705 changes shape to conform to the discontinuity. As a result, a portion of core 701 adjacent to detector 704 is not coplaner with other regions of core 701.

Waveguide core 701 is conformally placed on top of Ge detector 704. Because core 701 changes its direction as the light travels from left to right as viewed in FIG. 7 and as the light gets close to detector 704, the light will propagate out of core 701 and travel directly into detector 704, as indicated by arrow 706.

The embodiments shown so far for coupling light from a high index difference waveguide to an on-chip detector indicated examples of an on-chip detector grown or fabricated on the wafer substrate. The scope of the invention is not limited to such a case but also covers devices built on another wafer substrate and bonded to a wafer where the final chip is going to be fabricated.

Figure 8:
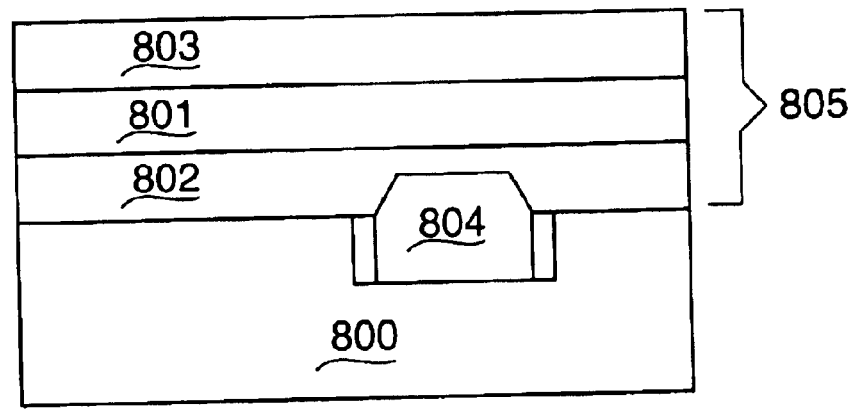
FIG. 8 is a side elevational view of an on-chip device inserted into a trench by wafer bonding.

FIG. 8 shows a side elevational view of an exemplary embodiment of detector 804 that is bonded to substrate wafer 800. In this embodiment, a trench is made in substrate 800 by etching the substrate to define a region where an on-chip device will be inserted. Device 804 can be built as a discrete component on another wafer, giving flexibility of processing and incorporating such devices made from materials such as indium phosphide or gallium arsenide with silicon based processing technologies. Once the device 804 is inserted into the trench by wafer bonding and separated from the wafer source, waveguide formation of a high index waveguide 805, having a core 801, upper cladding 803 and lower cladding 802, is done as illustrated in FIG. 1. As a result, core 801 is in close proximity to the on-chip device either for vertical coupling or horizontal coupling.

Other on-chip functions aside from detectors can also be integrated using the embodiments of the invention described above. For example, waveguide devices, tuning devices, modulator devices, electronics, and active devices that are close to the substrate surface can be formed as discrete components on other wafers and then integrated with the high index difference waveguide connected to the mode converter and the low index difference waveguide.

Figure 9:
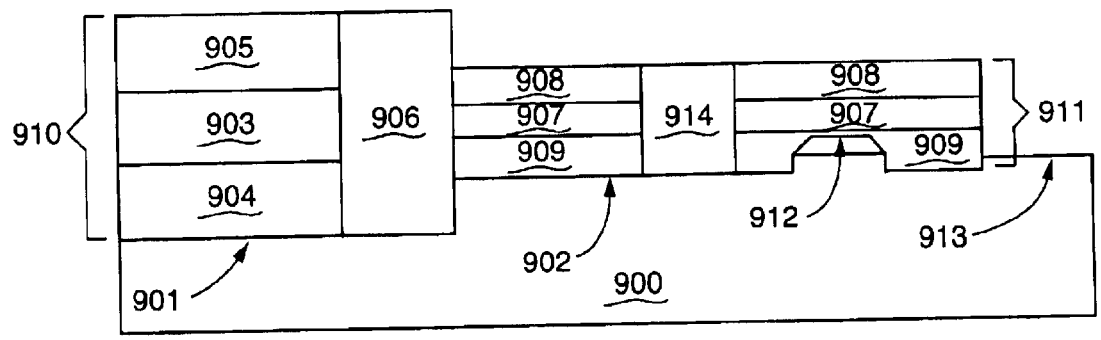
FIG. 9 is a side elevational simplified schematic view of an exemplary embodiment of an integrated system consisting of low and high index difference waveguides with possible photonic circuits, a mode converter, and an on-chip device.

An embodiment of an integrated system is illustrated in FIG. 9 showing a side elevational view of such an integration that includes low index difference waveguide 910, mode converter 906, high index difference waveguide 911, and an on-chip function 912, all built on a substrate 900 with two different surface heights 901 and 902 with respect to the unetched substrate surface 913. As discussed above, low index waveguide 910 includes core 903, lower cladding 904 and upper cladding 905. Similarly, high index waveguide 911 includes core 907, lower cladding 909 and upper cladding 908. On-chip function 912 is disposed on substrate 900 and extends toward core 907. An optional high index difference waveguide device 914 can also be provided; connected to a high index difference waveguide 911 that is coupled to an on-chip device 912.

For that matter, the low index difference waveguide section may also include an associated low index difference waveguide device. On-chip function 912 can be a detector as described in the previous embodiments, but it is not limited to such a detector. It can, in other embodiments, be any other on-chip function. Such an on-chip function can be any optical function, such as any structure or device that is used to generate, modify, and/or measure the amplitude, frequency, wavelength, dispersion, timing, propagation direction, and/or polarization properties of one or more light pulses. In addition, the on-chip function could be an optoelectric function.

On-chip function 912 can be physically separated from waveguide core 907, but it can also be in contact with core 907. On-chip function 912 can also be placed by wafer bonding method as illustrated in FIG. 8. Furthermore, the coupling of a high index difference waveguide core 907 and on-chip function 912 can be in a variety of coupling configuration, as shown in FIGS. 2 through 8. The specific configuration is determined by the desired mode interaction between waveguide 911 and on-chip function 912. Upper-cladding 908 of high index difference waveguide 911 is much thinner than upper-cladding 905 of low index difference waveguide 910 in this embodiment. In other embodiments, these cladding layers 908, 905 can be of similar thickness or the same thickness without changing the scope of the invention.

In addition to the described integrated device above, another method of coupling light from a waveguide to an on-chip device is to form a structure that guides light from the waveguide to the underlying on-chip detector through many microns. Such a structure can be a region surrounded by light reflecting surfaces so that the waveguide is terminated inside the region. Light, coming out of the waveguide, is reflected off the surfaces and directed to the on-chip device, enabling the coupling of light from the waveguide to the on-chip device.

The second aspect of the present invention is directed to an integrated device that includes a waveguide and an on-chip device formed on an optical chip so that an end of a waveguide is terminated inside a region surrounded by reflective surfaces. The region encloses an end of a waveguide and also an on-chip detector. The purpose of the region is to form a confined area effectively surrounded by reflective surfaces in which light coming from the waveguide is trapped and directed toward the on-chip detector for coupling of light from the waveguide to the on-chip detector. The surrounding structure confines light in a local region and directs light towards an on-chip device from a waveguide, and the surrounding should be sufficient to effectively achieve a minimum required coupling efficiency between the waveguide and the detector.

Figure 10A:
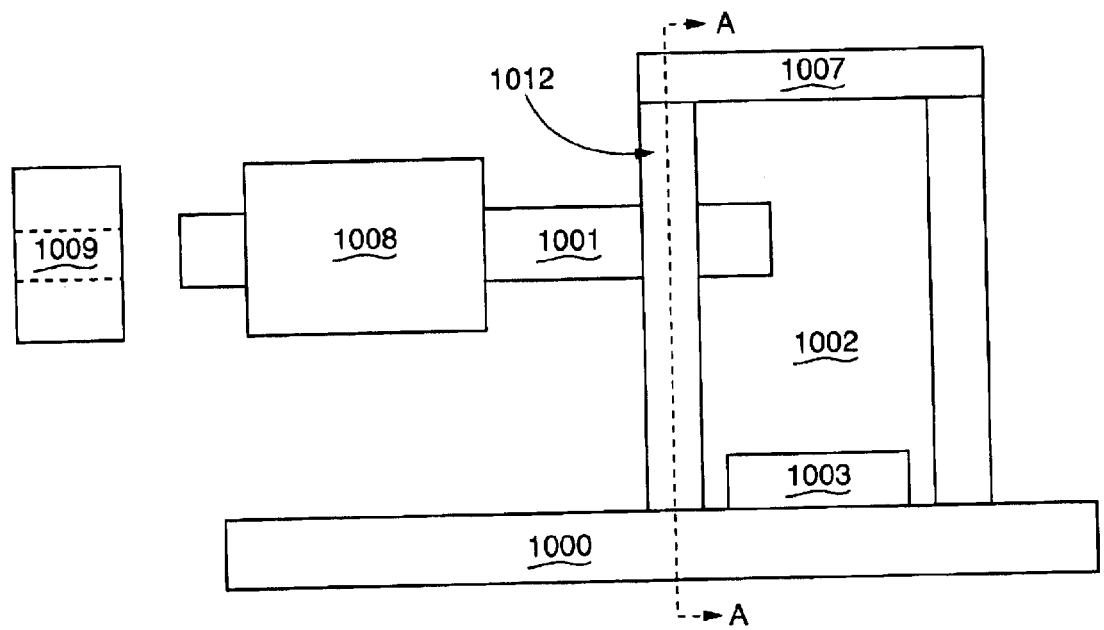
FIG. 10A is a side elevational simplified schematic view of an exemplary embodiment of an integrated device where an end of a waveguide is terminated inside a region surrounded by metal so that light escaping the waveguide is reflected and confined in the region towards an on-chip device.

In one embodiment, metal such as aluminum can be used as the reflecting surface of the region, and the inside of the region can be dielectric material as seen in FIG. 10A, which shows a side elevational view of such an embodiment. A light confining region 1002 is bounded by substrate 1000, walls 1010, and 1011/1012, as well as wall 1007. Waveguide 1001 extends into region 1002. On-chip device 1003 is disposed within region 1002; preferably on substrate 1000, but may be at a focal point for the reflected light. Waveguide 1001 is separated from the substrate within region 1002 by a distance equal to the cladding layer, usually several microns, and minimum 4 μm for a low index difference waveguide.

As will be shown in FIGS. 13A–13E below, to fabricate such a light confining region, trenches are etched around an end of waveguide 1001 and around on-chip device 1003. Then, the trenches of the region are filled with aluminum, thus defining sidewall reflecting surfaces 1010, 1011/1012 and 1007. Area of region 1002 opposite wall 1007 is preferably where on-chip detector 1003 is fabricated.

As seen in FIG. 10A, waveguide 1001 is terminated inside region 1002. Region 1002 is filled with a dielectric material surrounded by walls 1010, 1011/1012, and a wall 1007 opposite substrate 1000. Waveguide 1001 can be connected to any function 1008, such as a mode converter, which can also be connected to an external fiber 1009. On-chip detector 1003 is built on the substrate and is inside region 1002. Sidewalls 1010, 1011/1012 are shown vertical, but slanted sidewalls may be desired.

Figure 10B:
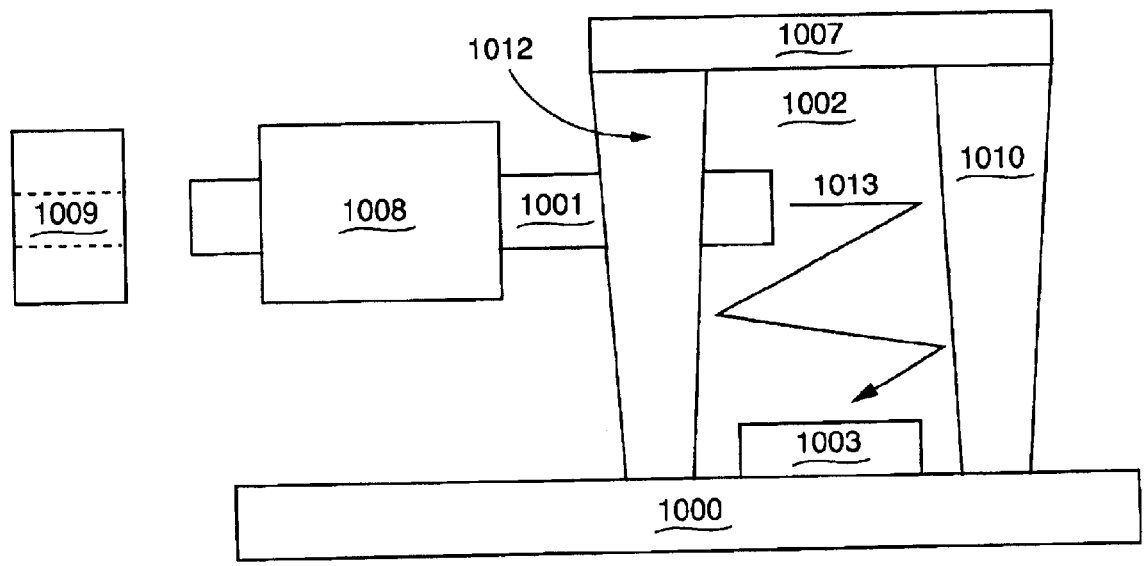
FIG. 10B is a side elevational view of the same device shown in FIG. 10A except the sidewalls are slanted.

If the sidewall angles are slanted so that the light bouncing between 1010, 1011/1012 is directed toward on-chip detector 1003, they will improve the efficiency of coupling light from the waveguide 1001 to the on-chip detector 1003 on the bottom of the confined region. FIG. 10B shows such an alternative embodiment in which like numerals are used to identify like structures. Slanted sidewalls (faces normal to light exiting the waveguide) 1010', 1011'/1012' of region 1002 direct the light coming out of waveguide 1001 toward substrate 1000 as light bounces between the sidewalls, as shown by arrow 1013. Such slanted angles are achievable during the etching process of the trenches, where non-vertical sidewalls result from the specific etching conditions of dry etching typically used in microfabrication.

Figure 11:
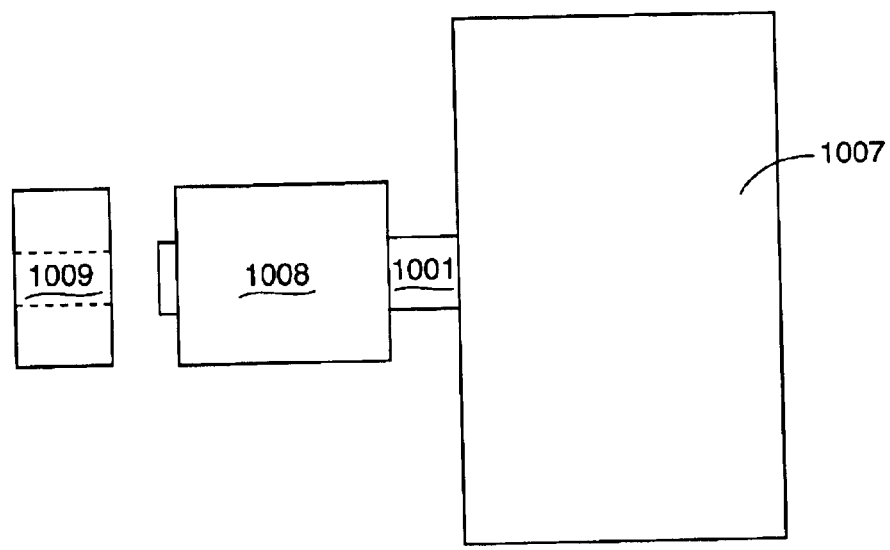
FIG. 11 is a top plan view of the integrated system of FIG. 10 where the region is a square shape.

FIG. 11 is a top plan view of the integrated device shown in FIG. 10A. In this FIG. 11, a squared shape is shown for the region that guides light from waveguide 1001 to on-chip detector 1003. The light coming out of waveguide 1001 enters region 1002, is reflected among wall 1007 and the sidewalls 1011/1012, 1010 and eventually travels to on-chip detector 1003 that is placed opposite wall 1007 within region 1002.

Figure 12:
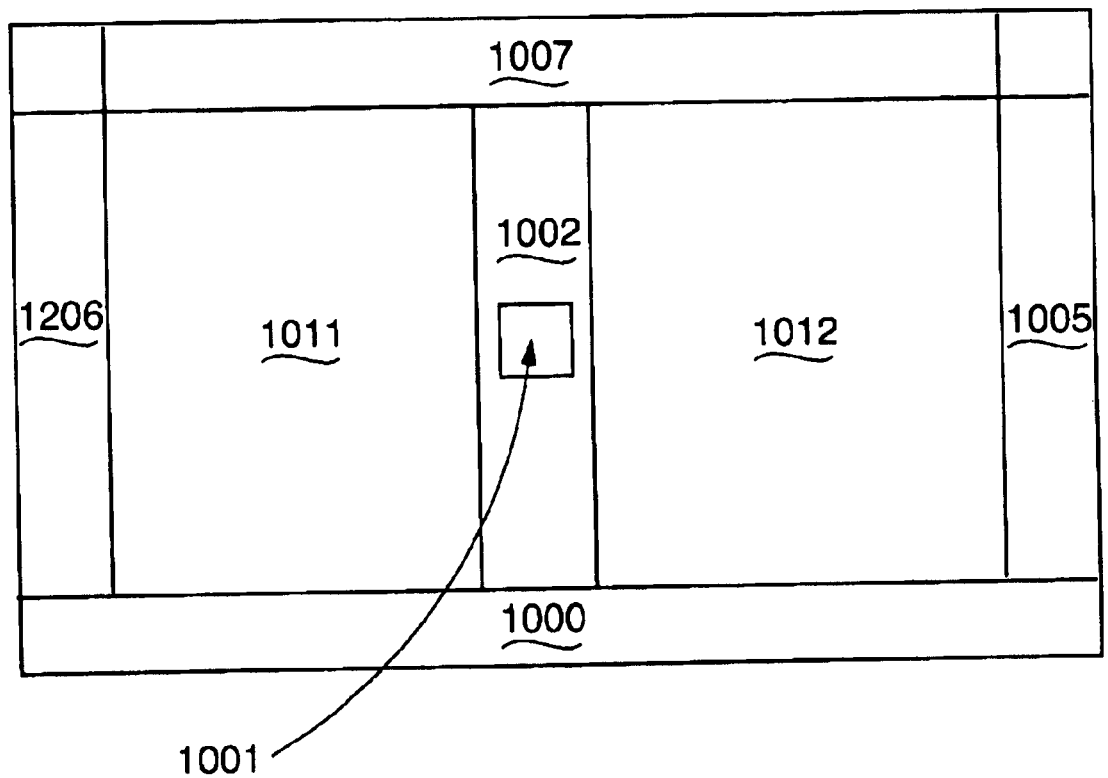
FIG. 12 is a cross sectional view along line A–A' of FIG. 10A.

Reference is now made to FIG. 12 which shows the cross-sectional view along line A–A' in FIG. 10A. Reflective sidewalls 1205, 1206, 1011, and 1012 formed on substrate 1000 and wall 1007 surround region 1002. The light from waveguide 1001 enters the region 1002 and gets reflected by these reflective surfaces and eventually get coupled into the on-chip detector.

Figure 13A:
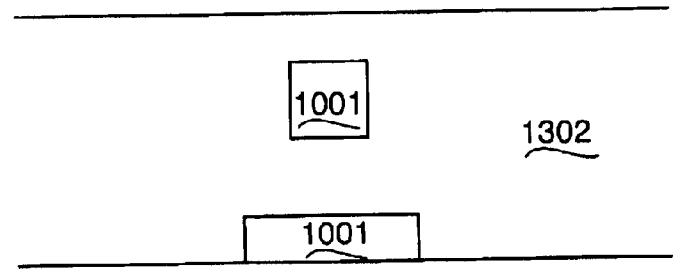
FIGS. 13A–13E show a fabrication sequence to create a region surrounded by metal.
Figure 13B:
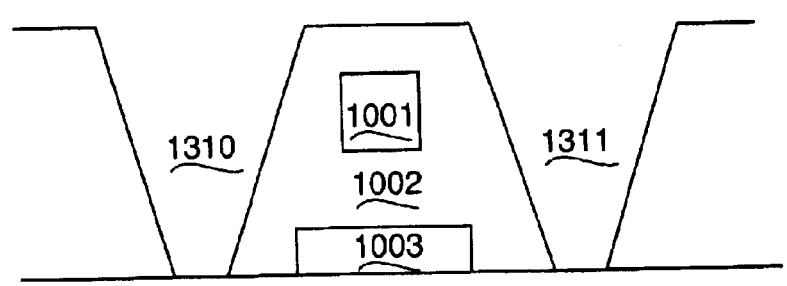
Figure 13C:
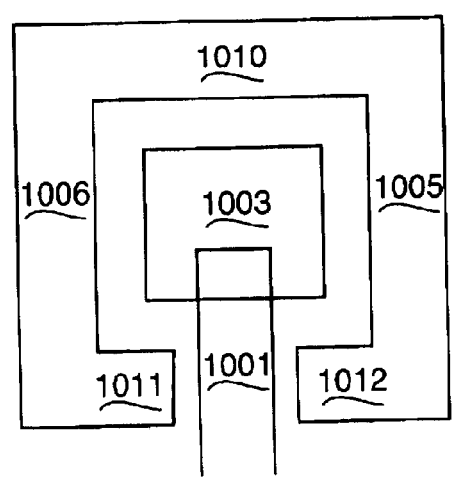

Reference is now made to FIGS. 13A–C in which the manufacturing processes of the structure shown in FIG. 11 is provided. As seen in FIG. 13A, waveguide core 1001 is surrounded by cladding 1302, which is disposed on on-chip device 1003. Trenches 1310 and 1311 are etched into cladding 1302 as shown in FIG. 13B. FIG. 13C is a top plan view of 13B with the trenches etched with sidewalls 1010, 1011, 1012, 1205, and 1206 that surround the region 1002.

Figure 13D:
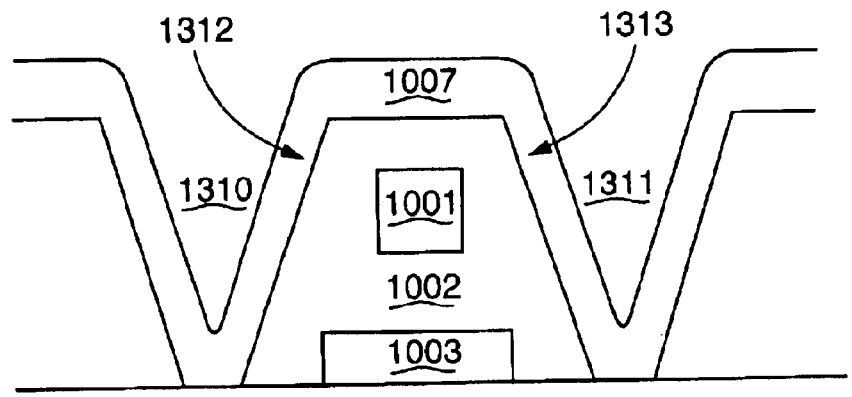

The trenches are filled with metal in FIG. 13D to make reflective surfaces 1312 and 1313 on the walls 205, 1206 formed in trenches 1310 and 1311, as well as surface 1007. Due to the manufacturing simplicity, the opening of the region through which the waveguide enters the region has no metal above or below waveguide 1001 in FIGS. 13C and 13D. One can, however, choose to enclose this opening with metal above or below the waveguide 1001 in order to increase the efficiency of the entrapment of light in the reflection-enclosed region.

Figure 13E:
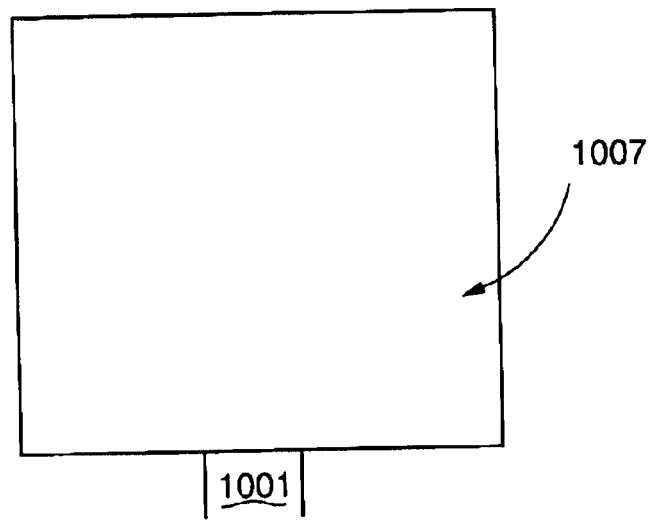

FIG. 13E is a top view of FIG. 13D where the region 1002 is surrounded by metal sidewalls of 1010, 1012, 1011, 1205 and 1206 with surface 1007.

Figure 14:
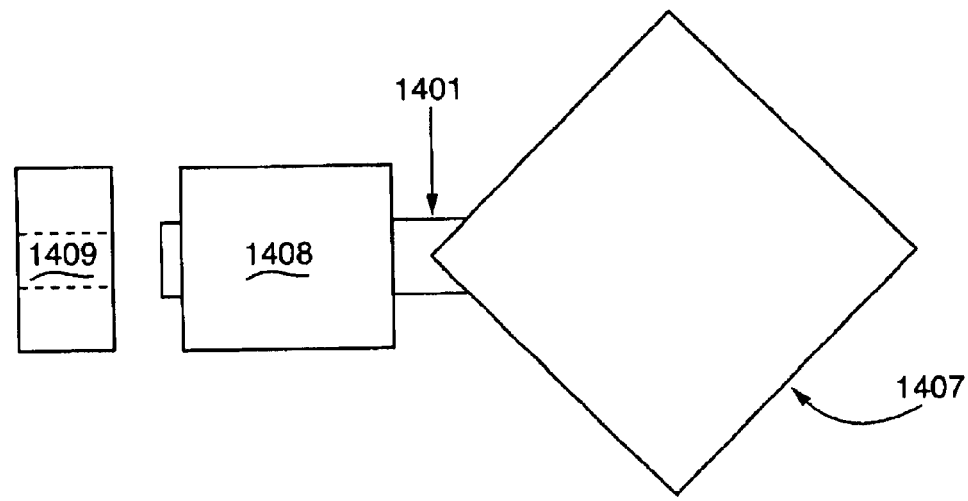
FIG. 14 is a top plan view of the integrated system of FIG. 10 where the region is a diamond shape.

One potential problem with a square shape for the light reflective region 1002 in FIG. 11 is that the light from a waveguide hits the surface 1104 and reflected back into the waveguide. To alleviate this potential problem, other shapes such as a diamond shaped region with metal walls affixed at the sides of a diamond shaped surface 1407 can be used as illustrated in the embodiment of FIG. 14. The light from a waveguide 1401 enters the region bounded by surface 1407 and metal walls, similar in structure to those discussed above in connection with FIG. 10, and gets reflected by the sidewalls. However, the reflected light will not easily couple back into waveguide 1401 with this embodiment. Waveguide 1401 may be coupled to an on-chip function 1408, which receives inputs from an optical fiber 1409. In fact, any shaped region can be used as long as it is effectively surrounded by reflective material to direct light to an on-chip detector.

Figure 15:
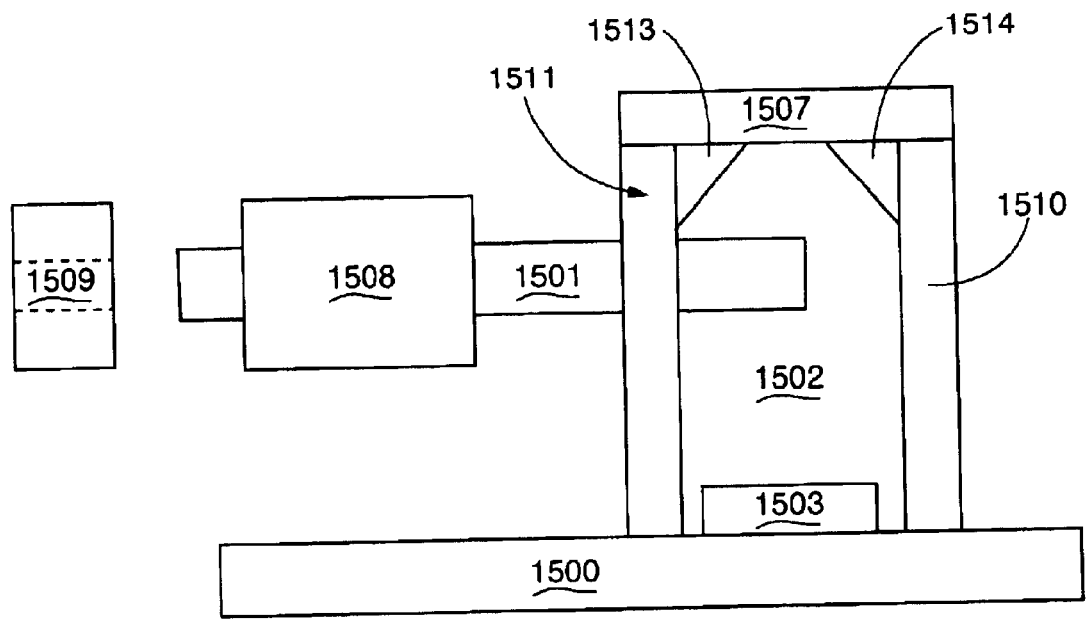
FIG. 15 is a side elevational view of simplified schematic view of an exemplary embodiment of an integrated device showing angled top corners inside the region for better convergence of light onto an on-chip device.

As discussed above, slanted sidewalls can help better direct light towards the bottom of the region towards an on-chip detector. Again, a region 1502 is bounded by a substrate 1500, surface 1507, walls 1510, and 1511/1512. An optical device such as detector 1503 is disposed within region 1502, preferably on substrate 1500. Waveguide 1501, coupled to function 1508 and fiber 1509, extends into region 1502. To achieve better coupling efficiency, top corners of the region indicated by 1513 and 1514 can be angled as shown in FIG. 15 to better reflect light towards on-chip detector 1503. One can choose to make the sidewall to have a slanted angle all the way from the top to the bottom. One can also choose to have many different sidewall angles along the sidewalls of the region. Such an angled sidewall is possible to manufacture through varying etching process conditions.

Figure 16:
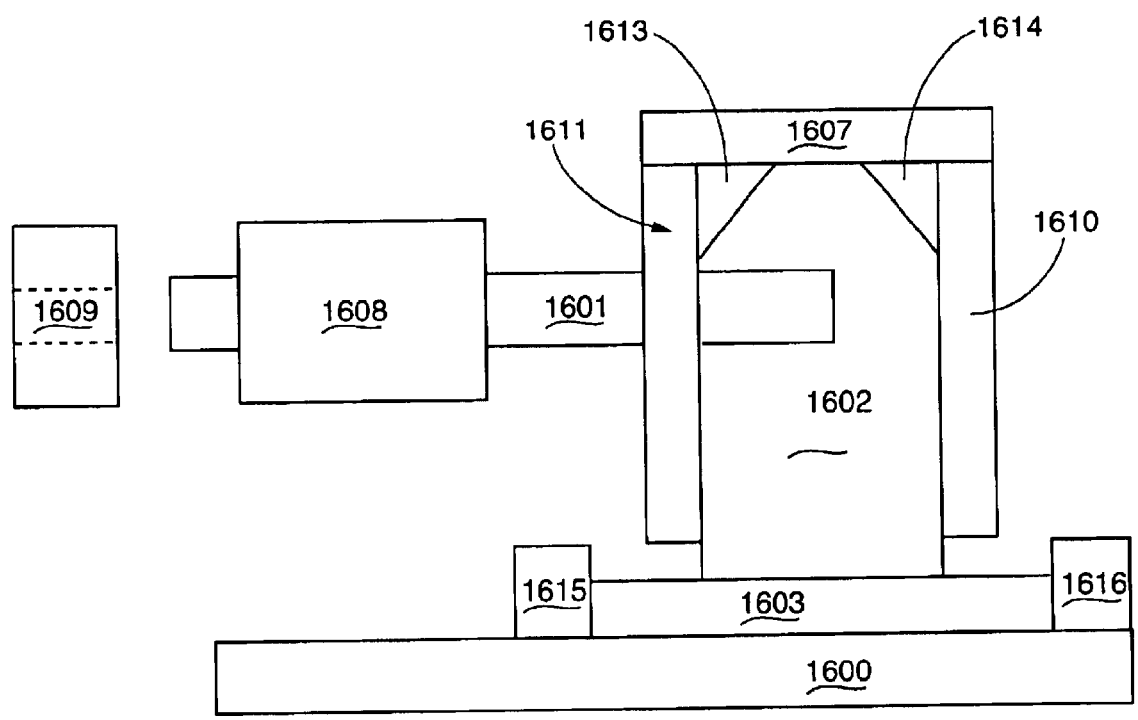
FIG. 16 is a side elevational view of simplified schematic view of an exemplary embodiment of an integrated device with an on-chip detector extending beyond the region surrounded by metal, allowing the on-chip device contacts to be made outside of the region.

FIGS. 10–15 show an embodiment where the whole part of an on-chip detector is inside the light confining region. However, the invention presented here is not limited to such a case. As shown in FIG. 16 for a side elevational view of one exemplary embodiment, the on-chip detector can extend out of the confining region, where contacts 1615 and 1616 are made. Again, a confining region 1602 is bounded by walls 1607, 1610, and 1611/1612. In this embodiment, region 1602 is also bounded by detector 1603, which is a substantially non-reflective surface. Detector 1603 is disposed between substrate 1600 and contacts 1615, 1616. Waveguide 1601 extends into region 1602. Angled portions 1613, 1614 are disposed across region 1602 from detector 1603. Also, sidewalls 1610 and 1611/1612 do not have to touch the top of a substrate 1600. Any potential light leaking out of the region is absorbed into the extended area of the detector 1603.

Another significant problem with integrating detectors with high index difference waveguides is the necessity of placing contacts in a small detection region. However, the use of transparent contact material such as tantalum (Ta), tantalum nitride (TaN), Titanium (Ti), or Titanium Nitride (TiN), instead of metals such as aluminum that reflects light, to provide for metal connections to the detector will alleviate such "surface filling"effects, in which a substantial portion of the light to be detected is reflected by the metal contacts.

Any references to front and back, right and left, top and bottom, upper and lower, and horizontal and vertical are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the present inventions have been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. An integrated device comprising:
    a substrate;
    a low index difference waveguide disposed on said substrate;
    a high index difference waveguide disposed on said substrate, said high index waveguide having a high index difference waveguide core;
    a mode converter disposed on said substrate for optical mode transformation between said low index difference waveguide and said high index difference waveguide;
    an on-chip device optically coupled to said high index difference waveguide core; and
    said substrate having a surface, the surface exhibiting at least a first height and a second height, the firm height not being equal to said second height, said low index difference waveguide being disposed at said first height, said high index difference waveguide being disposed at said second height.

2. The integrated device of claim 1, wherein said first height is lower than said second height.

3. The integrated device of claim 1, wherein a trench is etched into the substrate where the substrate surface height on top of which said low index difference waveguide is built is lower than the height of the substrate surface used for said high index waveguide.

4. The integrated device of claim 2, wherein a trench is etched into the substrate to form said first height.

5. The integrated device of claim 1, wherein said substrate surface exhibits a third height, the first height being lower than the third height.

6. The integrated device of claim 5, further comprising a trench in the substrate, said trench being at said second height, the second height being lower than the third height.

7. The integrated device of claim 1, wherein the second height is the unprocessed height of the substrate.

8. The integrated device of claim 1, wherein said mode converter is disposed on the substrate at the same height as said low index difference waveguide.

9. The integrated device of claim 1, further comprising a trench formed in said substrate, said trench forming said first height and wherein said low index difference waveguide is a discrete component bonded to the trench.

10. The integrated device of claim 1, further comprising a trench in said substrate, said trench forming said second height and wherein said high index difference waveguide is a discrete component bonded to the trench of the substrate.

11. The integrated device of claim 7, wherein said on-chip device is disposed at said second height kind said high index difference waveguide is a discrete component bonded to the substrate at said second height.

12. The integrated device of claim 1, wherein said low index difference waveguide said mode converter, and said high index difference waveguide components, and said low index difference waveguide and mode converter are bonded to the substrate at said first height, and said high index difference waveguide is bonded to said substrate at said second height.

13. The integrated device of claim 1, wherein said on-chip device is integrally formed on the substrate surface.

14. The integrated device of claim 1, wherein said on-chip device is a discrete component and bonded to the substrate surface.

15. The integrated device of claim 1, further comprising a trench formed in the substrate and said on-chip device is a discrete component bonded to the trench.

16. The integrated device of claim 1, wherein optical coupling between said on-chip device and said high index waveguide core occurs through optical mode coupling between the high index waveguide device core and the on-chip device.

17. The integrated device of claim 16, wherein said on-chip device is disposed between said substrate and said high index waveguide.

18. The integrated device of claim 16, wherein said high index waveguide is tapered for better optical mode coupling near said on-chip device.

19. The integrated device of claim 16, wherein said high index waveguide core is disposed at a side of said on-chip device.

20. The integrated device of claim 19, wherein said on-chip device is tapered near said high index waveguide for better optical mode coupling.

21. The integrated device of claim 1, wherein said high index waveguide core is butt-coupled into said on-chip device.

22. The integrated device of claim 21, wherein said on-chip device is a detector.

23. The integrated device of claim 1, wherein the coupling between said on-chip device and said high index waveguide core occurs through light reflection from the high index waveguide core to said on-chip device.

24. The integrated device of claim 23, wherein said high index waveguide core is etched to produce a slanted surface by which light traveling through said high index waveguide core is reflected to said on-chip device.

25. The integrated device of claim 24, wherein said slanted surface is coated with light reflecting material.

26. The integrated device of claim 25, wherein said light reflecting material is aluminum.

27. The integrated device of claim 24, wherein the slanted surface of said high index difference waveguide faces away from said on-chip device.

28. The integrated device of claim 24, wherein the slanted surface of said high index difference waveguide has a light incident angle such that the reflected light escapes the waveguide towards said on-chip detector.

29. The integrated device of claim 27, wherein the slanted surface at the end of said high index difference waveguide is coated with light reflection material.

30. A method for bi-directionally coupling of optical signals in integrated planar light wave circuits comprising:

providing a substrate, forming a trench in said substrate to provide a first substrate surface and a second substrate surface on the substrate, the first substrate surface being lower than said second substrate surface;

providing a low index difference waveguide on said substrate at said first substrate surface;

providing a high index difference waveguide on said substrate on said second substrate surface;

providing a mode converter for optical mode transformation between said low index difference waveguide and said high index difference waveguide on said first substrate surface; and providing an on-chip device on said substrate, said on-chip device being optically coupled to said high index difference waveguide.

31. The method for bi-directionally coupling of optical signals of claim 30, wherein said high index difference waveguide includes a high index difference waveguide core and said low index difference waveguide includes a low index difference waveguide core, the height of the first substrate surface and said second substrate surface being arranged so that said low index difference waveguide core is substantially coplanar with said high index difference waveguide core.

32. The method for bi-directionally coupling of optical signals of claim 30, further comprising the step of providing an optical device optically coupled to said low index difference waveguide.

33. The method for bi-directionally coupling of optical signals of claim 30, wherein said on-chip device is a detector.

34. The method for bi-directionally coupling of optical signals of claim 30, wherein said on-chip device is disposed on said second surface of the substrate.

35. The method for bi-directionally coupling of optical signals of claim 34, wherein said on-chip device is a detector.

36. The method for bi-directionally coupling of optical signals of claim 34, wherein said on-chip device is a discrete component bonded to said substrate.

* * * * *